Feb. 3, 1959 A. R. LUCAS 2,872,672

TELEPHONE RINGER AND THE LIKE

Filed June 30, 1953 5 Sheets-Sheet 1

INVENTOR.
Alfred R. Lucas,
BY Brown, Jackson,
Boettcher & Dienner
Attys

Feb. 3, 1959 A. R. LUCAS 2,872,672

TELEPHONE RINGER AND THE LIKE

Filed June 30, 1953

5 Sheets-Sheet 2

INVENTOR.
Alfred R. Lucas,
BY Brown, Jackson,
Boettcher & Dienner
Attys.

TELEPHONE RINGER AND THE LIKE

Filed June 30, 1953

5 Sheets-Sheet 3

INVENTOR.
Alfred R. Lucas,
BY Brown, Jackson,
Boettcher & Dienner
attys.

TELEPHONE RINGER AND THE LIKE

Filed June 30, 1953 5 Sheets-Sheet 4

INVENTOR.
Alfred R. Lucas,
BY Brown, Jackson,
Boettcher & Dienner
Attys.

Feb. 3, 1959 A. R. LUCAS 2,872,672

TELEPHONE RINGER AND THE LIKE

Filed June 30, 1953 5 Sheets-Sheet 5

INVENTOR.
Alfred R. Lucas,
BY Brown, Jackson,
Boettcher & Dienner
Att'ys 2,872,672

TELEPHONE RINGER AND THE LIKE

Alfred R. Lucas, Galion, Ohio, assignor to North Electric Company, a corporation of Ohio Application June 30, 1953, Serial No. 365,025

5 Claims. (Cl. 340—392)

The present invention relates to an electromagnetically operated signalling device, and more particularly to ringers especially adapted for use in telephone substation sets.

In the telephone sets first commercially marketed in the field it was customary to employ a separate box to house most of the numerous components associated with the subscriber substation. Such equipment in addition to being rather unsightly was space consuming and proportionally more expensive. As a result, efforts were soon understaken to develop a substation set which was capable of housing the substation components. Particularly troublesome in the development of such a unit was the limited space available in a conventional type desk stand and the weight of the components which were to be housed therein.

While various types of desk stands have been developed, these considerations are still a problem in the field today. One of the bulkier and heavier components now used in substation sets is the ringer unit, and it is a particular object of this invention to provide a telephone ringer for use in substation sets which is extremely compact in structure, relatively light in weight, and which is particularly adapted for inclusion in a telephone substation in a minimum of space and at a minimum of cost. In achieving this general object it is a specific object to provide a novel improved type single-coil telephone ringer.

A modern telephone exchange must be equipped to provide a number of types of service, and in the provision of these various kinds of service, different types of signalling devices have been conventionally employed. Among the more conventional signalling systems utilized in the field today are the so called straight line ringing system, the harmonic ringing systems, and the superimposed ringing system. Inasmuch as the various signalling systems operate in response to different electrical characteristics, it has heretofore been necessary in the art to provide at least two separate and distinct types of ringers for use in these various types of signaling systems. These two types comprise: (1) the harmonic type and (2) the straight line and superimposed type, it being understood that a common practice has been to provide a superimposed ringer by modifying a straight line ringer. The manufacturing of different types of ringers for different types of systems, in addition to being a nuisance, is expensive and costly, and it is therefore a further object of this invention to provide a novel ringer structure having the aforedescribed characteristics which is sufficiently flexible in its nature to permit the use of the general design thereof in all of these types of signalling systems.

In the provision of a versatile unit of the type described, it is a further object of the invention to provide a unit which is so designed that the assembly and adjustment thereof may be effected by unskilled operators in a minimum amount of time. In the assembly and adjustment of conventional type telephone ringers, it is presently necessary to perform complicated, costly, and time consuming adjustments prior to inclusion in the substation sets. It is not uncommon to have a skilled operator spend considerable time adjusting each ringer prior to its acceptance. In many instances complicated equipment is also required. A feature of the novel ringer unit of the present invention is the manner in which the ringer may be assembled by unskilled operators on an assembly line basis without necessitating any time consuming or technical adjustments. One specific example is the manner in which the magnetic circuit includes a fixed large area air gap which requires no adjustment.

Another feature of the invention is the novel armature control arrangement which comprises the utilization of a conical helical or spiral spring.

Another feature of the invention is the manner in which the ringer provides a high value of sound output in response to a low power input and the high amplitude sensitive response of the ringer.

An outstanding feature of the arrangement is the manner in which the vibratory member of the ringer in each embodiment is in pivotal contact with the polarizing member of the ringer unit (or a pole-piece member thereof). Through the utilization of this novel pivoting arrangement for the armature member of the ringer, a minimum of reluctance is encountered in the armature pivoting region, and accordingly response of the ringer to extremely small current values is accomplished. Another factor providing a low reluctance magnetic circuit is the provision of large area armature and pole-piece facing surfaces. Another feature of certain embodiments of the arrangement is the manner in which a magnetic path is provided for the A.-C. ringing flux which extends over the polarizing magnet of the ringer unit, whereby a greater impedance to voice currents through the ringer is obtained.

A further feature of the invention is the manner in which the ringer structure in general offers high impedance to voice currents and is operative on an extremely small amount of power, whereby a larger number of ringer units may be used on a single line and more economical service may be provided for the subscribers.

In addition to the provision of the improved and novel type ringer arrangement, there has been provided herewith several novel volume control arrangements which permit adjustment of the volume output of the ringer unit by the subscriber.

These and other features of the invention will become apparent with reference to the following specification and claims when considered in relation to the accompanying drawings in which Figure 1 is a front view of one telephone ringer embodying the features of the invention;

*General description*

Figures 1, 2, 3, 4, 5, 23:
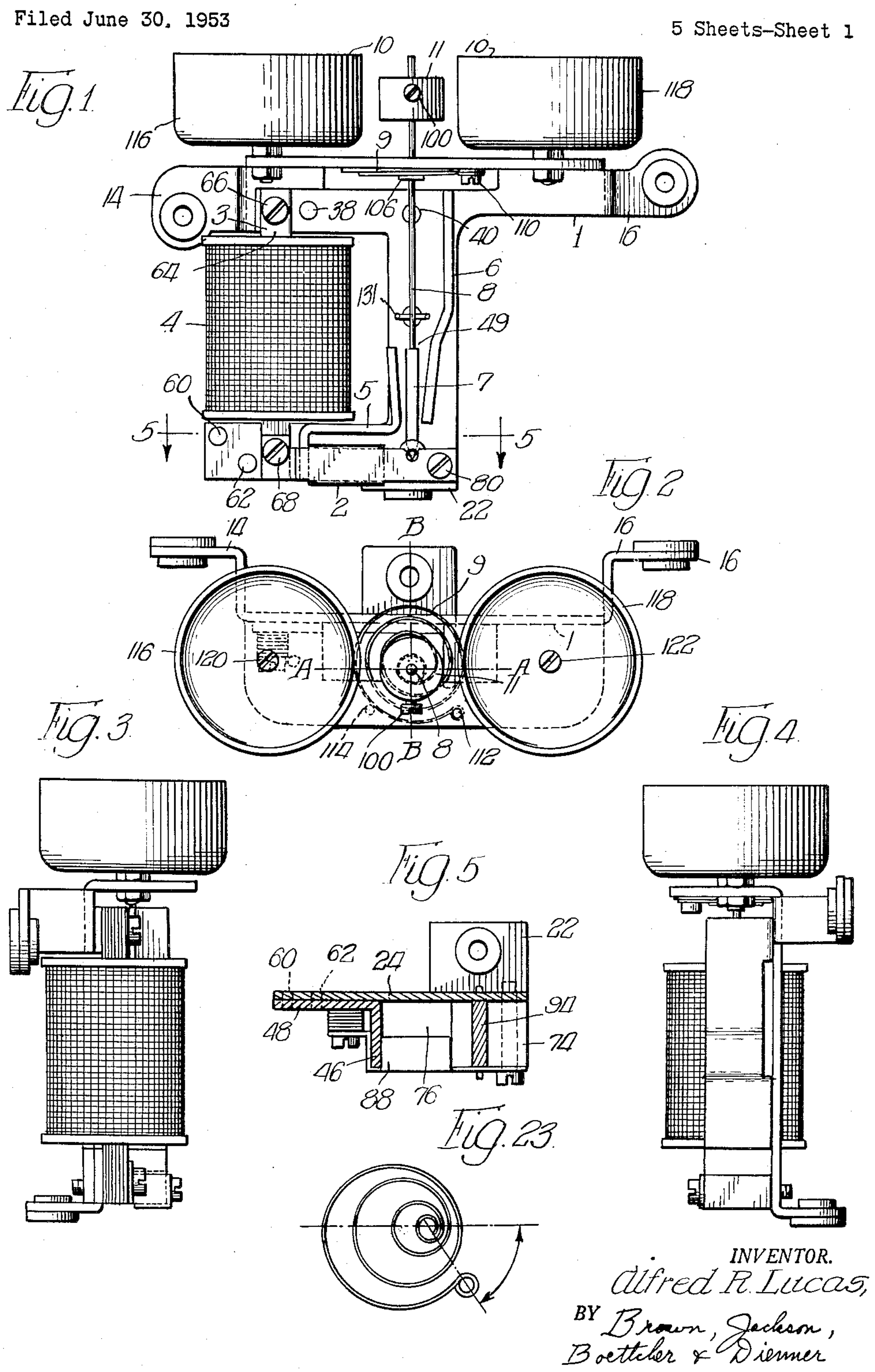
Figure 2 is the top plan view of the ringer shown in Figure 1.
Figure 3 is a view of the left side of the ringer shown in Figure 1.
Figure 4 is a view of the right side of the ringer shown in Figure 1.
Figure 5 is a section taken along the line 5—5 of Figure 1 and looking in the direction of the arrows.
Figure 23 is a top plan view of an eccentric spring mounting.

The new and novel structure of the invention lends itself to use in a number of improved ringer embodiments, certain of which are set forth in specific detail hereinafter. Each of the novel signal devices or ringers of the invention basically includes certain essential elements such as a frame member 1, a permanent magnet 2, a core member 3, a coil 4 which encompasses the core 3 and which is arranged to be connected to an external source of energization, a first and second pole piece member 5 and 6 respectively which are connected at their one extremity to the upper and lower ends of core 3, and which have their opposite ends mutually disposed to form an air gap therebetween. Both of the pole pieces 5 and 6 are also connected so as to be polarized by a common pole or like pole of the permanent magnet 2. Each ringer unit further includes an armature 7 pivotally mounted in a groove in the second pole of the permanent magnet 2, or a pole-piece extension thereof; a reed 8 which is supported on one end of the armature for movement thereby; a conical-helical or spiral spring 9, the center of which is frictionally attached to the reed 8 and the outside of which is fixedly battened to the frame 1; a pair of gongs 10 fastened eccentrically to the frame 1; and a clapper 11 mounted on the reed between the gongs for slidable adjustment along the length of the reed. A volume control unit may be used with any of the embodiments illustrated, but is not included on each of the units in the drawings.

In each embodiment taught herein the armature member is mounted in direct contact with the permanent magnet member (or a pole-piece extension thereof) whereby an extremely efficient polarizing path is provided for the operating elements of the ringer structure. As a result of this more direct path a more sensitive and more positive acting ringer unit is provided, and the relative adjustments of the various components is made less critical.

In certain embodiments both left and right pole-piece members are in direct contact with a common or like pole of the permanent magnet, whereby a lower reluctance A. C. magnetic path is provided and a higher impedance to voice currents through the ringer is attained.

The novel use of a conical-helical or spiral spring in each embodiment as a control for the vibratory armature, or controlled member provides an extremely sensitive control arrangement which requires a minimum amount of space. That is, by attaching a conical-helical or spiral spring to the armature assembly so that as the assembly is moved from its normal position the eccentric coils of the spring are expanded and compressed, the desired returning force is provided in a minimum of space. Such arrangement is extremely flexible in that the amount of force provided by the spring can be readily varied by modifying the number of coil turns or by varying the wire size to suit the requirements of the pendulum or armature assembly. Lengthening of the spring for example to provide decreased force can be effected with little increase in the space required and vice versa.

The improved ringer structure including these novel features lends itself to ready use in all types of signalling applications including harmonic, straight line and superimposed ringers. In adapting the ringer unit as a harmonic ringer, for example, the air gap is set to a fixed predetermined value whereby quick assembly of the ringer is possible. In structures known heretofore it has been necessary to very carefully adjust the pole-pieces and the air gaps for each ringer unit in order to gain the maximum response (which may still be inadequate) to the power provided by the ringer coil.

The novel combination of electrical, magnetic and mechanical arrangements taught herein provides a ringer unit which is sensitive in its response without special attention to adjustment, which has small space requirements, and which is economical in manufacture.

*Basic ringer unit*

Detailed consideration is now given to one ringer embodiment, shown in Figures 1–6 inclusive, which is economical in its design, it being believed that the details of operation and manufacture of other embodiments taught hereinafter will be readily apparent from the following detailed discussion of this embodiment.

Figures 6, 7:
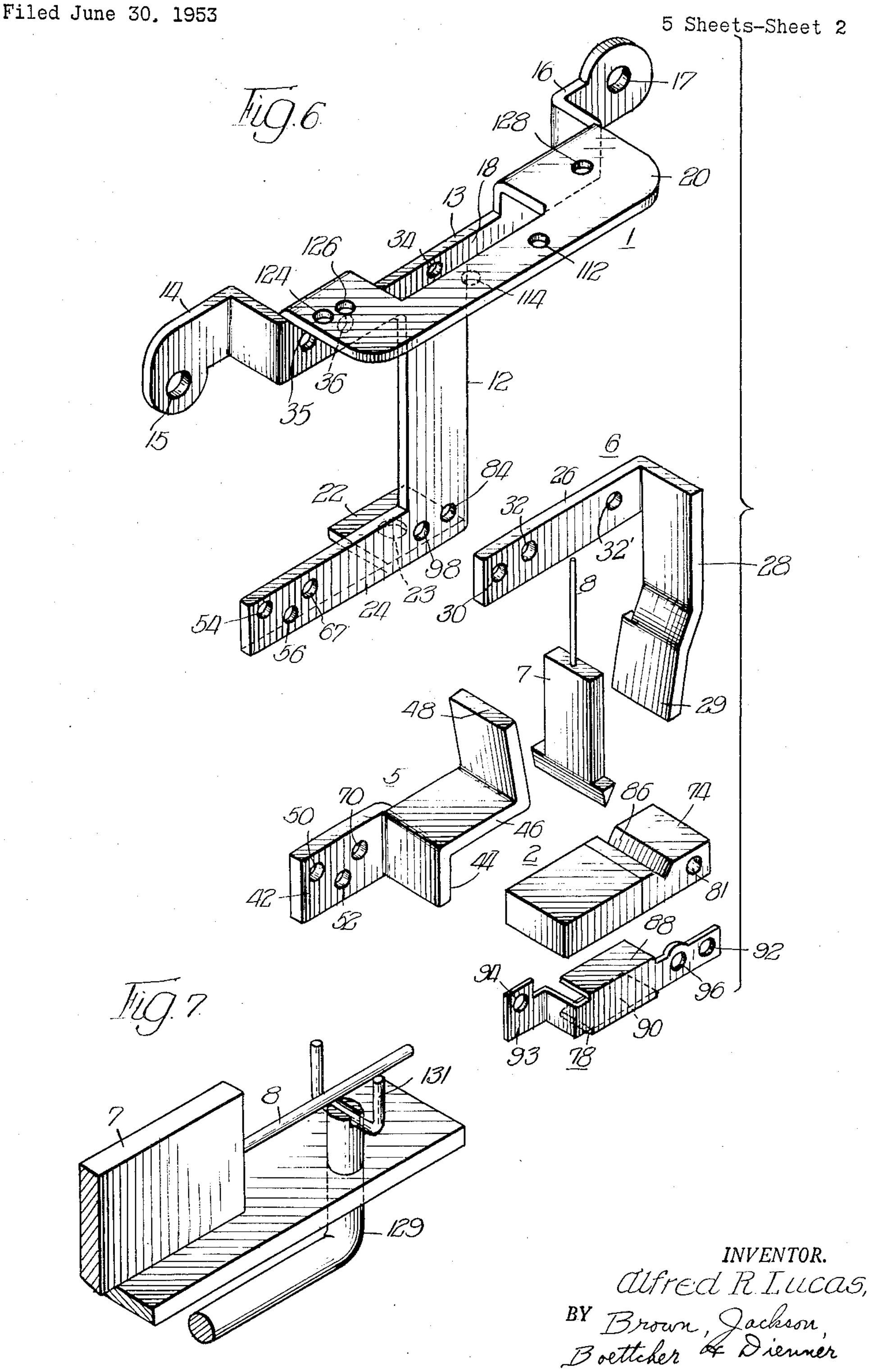
Figure 6 is an exploded perspective view of certain components of the ringer of Figure 1.
Figure 7 illustrates one of the novel volume control arrangements.

With reference to Figures 1–6 inclusive, and particularly to Figure 6, there is shown thereat a frame member 1 which is basically comprised of a T-shaped member having a central portion 12, and a top portion 13 which includes support arms 14 and 16 located at the extremities thereof. The support arms 14 and 16 are formed by bending the ends of the top portion 13 inwardly and perpendicularly to the top portion 13 for a short length and the remaining portion back into the plane of the top portion as shown in Figure 6. Apertures 15 and 17 are located in the support arms to permit ready fastening of the frame to the base of a substation set.

A central section is removed from the top of the frame as shown at 18, and the remaining portion is then bent perpendicularly forward to form a table or support member 20.

An extension at the bottom of the central portion 12 is bent perpendicularly rearward to form a further support tab 22. Aperture 23 in tab 22 in cooperation with suitable fastening means are used to further secure the ringer unit to the sub-station set.

A laterally extending portion 24 is provided at the base of the T, the portion of the frame adjacent the upper left hand arm 14 and portion 24 forming a U-shaped receiving section for the coil member 4. The frame of a commercial embodiment was approximately 3″ in height, and 4¾″ in width and was made of 1/16″ velete brass. The coil receiving section in this embodiment was approximately 1½″ square.

A first pole piece 6, shown in detail in the exploded perspective of Figure 6, includes a support arm 26, and integral therewith an arm portion 28 which extends vertically downward for approximately one-half its length, and which is thereafter angled to provide an armature facing surface 29.

A pair of apertures 32 and 32′ in the support arm 26 of the pole-piece member 6 are aligned with apertures 36 and 34 respectively in frame 1, whereby suitable fastening means such as rivets 38 and 40 may be utilized to securely fasten the pole-piece portion 6 to the frame 1.

A second pole-piece member 5 comprises a support arm 42 and an integral Z-shaped portion including a magnet contacting surface 44, a central connecting portion 46 and an armature facing surface 48. The armature facing surface 48 is formed so that with securing of the pole-piece to the frame, the armature facing surface is angularly displaced relative to the vertical, and forms with the armature facing surface 29 of pole-piece 6, a V-shaped air gap 49 as shown in Figure 1. Apertures 50 and 52 in the support arm 42 are aligned with apertures 54 and 56 in the frame member 1, whereby suitable fastening means such as rivets 60 and 62 may be used to fasten the pole piece 5 to the frame. The pole pieces in one embodiment were made of 3/32 magnetic iron (dead soft).

The inward ends of each of the pole-piece members 5 and 6 are connected to a laminated core 3 (shown in Figure 1) which comprises a plurality of rectangular shaped members of silicon steel which in one embodiment comprised bars of #29 U. S. gauge silicon steel which are 2½" long, ¼" wide, and .013" thick.

An aperture in the upper end of the laminations is aligned with aperture 30 of the upper pole-piece and the tapped aperture 35 of the frame, whereby machine screw means, such as shown at 66, may be used to fasten the laminations in firm contact with the upper pole-piece and to the frame. In a similar manner the lower ends of the core laminations are apertured to receive machine screw means, such as 68, the apertures in the core laminations being aligned with aperture 70 of the lower pole piece support arm 42 and the tapped aperture 67 in the frame. Screw means 66 and 68 thus serve to attach the laminated core 3 to the frame and also to bring the laminated core 3 into firm contact with the pole-pieces 5 and 6.

Core member 3 supports a coil member 4 which may comprise a series of windings of fine copper wire wound about a Bakelite core or a spool. Various size coils are used in accordance with the nature of the installation. One commercial embodiment used a coil winding comprised of 32,000 turns of #39 wire with a maximum winding area of .615 square inch and a maximum winding volume of 2.0 cubic inches.

A central aperture in the spool is rectangularly shaped to receive the laminated core 3. In mounting the coil member 4, the laminated bars of the core 3 are assembled and inserted through the aperture in the "Bakelite" spool and secured to the frame by screw means 66 and 68. The coil 4 is thus supported by the laminated core 3 in the U-shaped recess formed by the frame portion adjacent upper arm 14, the central portion 12 and the base portion 24 on frame 1.

The polarizing magnet 2 of the present embodiment is supplemented in the embodiment of Figure 1 by a pole-piece member 74 which is rectangular in shape and which is made of dead soft iron material. A V-shaped slot 86 is located on the upper face of the soft iron member 74, the slot extending across the width of the upper face thereof. The pole-piece extension member 74 is mounted with one end in firm contact with one pole of the permanent magnet 2 at the base of the frame 1.

As shown in Figures 1–6, the magnet 2 and the magnet pole-piece member 74 are fixedly positioned at the base of the frame 1 by means of a keeper member 78 and suitable fastening means such as machine screws 68 and 80. More specifically, the keeper member 78 comprises a main body portion which is adapted to extend along the sides of the soft iron pole-piece 74 and the magnet 2, and a pair of tab members 88 and 90 which are adapted to sandwich the magnet 2 therebetween. An aperture 92 is located in one end of the keeper in alignment with aperture 81 of the pole-piece to permit passage of a machine screw 80 therethrough to the tapped aperture 84 in the frame, and thus effect fastening of the keeper and the pole-piece to the frame. The opposite end of the keeper is bent inwardly perpendicular to the main body portion 90 and then back to the plane of the main body portion to provide a support arm 93 which is suitably apertured as shown at 94. The aperture 94 is aligned with the apertures in the lower end of the laminated core 3 and aperture 70 in the lower pole-piece, whereby the keeper is fixably positioned to the frame therewith by machine screw means 68.

It will be apparent from the foregoing description that as the magnet 2 and pole-piece extension 74 are attached to the frame with one end of the magnet 2 in abutting relation with the pole-piece extension 74, the other end of magnet 2 will abut portion 44 of the lower pole-piece member 5, and the V-shaped groove 86 in the pole-piece extension 74 will be in operative alignment with the V-shaped gap formed by the armature-facing surfaces of members 29 and 48 of the pole-pieces 6 and 5 respectively.

Armature member 7 comprises a rectangular solid member of dead soft magnetic iron having a V-shaped pivot portion at the lower end thereof, which in turn has a round edge of slightly smaller radius than that of the receiving groove 86 in the soft iron member 74. Furthermore, the angle of groove 86 is slightly larger than the angle of the pivot portion of the armature. The lower pivot end of armature 7 extends laterally beyond the sides of its upper portion for cooperation with an aligned aperture 96 in the keeper member 78 and an aperture 98 in the frame 1, whereby the armature is secured against displacement. With the pivot edge of the armature 7 located in groove 86 of the magnet pole extension piece 74, the upper portion of armature 7 will be located between the armature-facing surfaces 48 and 29 of the lower and upper pole-pieces 5 and 6 respectively.

A reed member 8, preferably of non-magnetic material, of approximately .071" in diameter is secured at its one end to the upper end of armature 7 and at its other end carries a slidably adjustable clapper member 11. In the present arrangement the reed is secured to the armature by insertion in a receiving hole in the upper edge of the armature and swaging thereto.

Clapper member 11 comprises a solid cylindrical member of material which is centrally apertured to the approximate diameter of reed 8 whereby the clapper may be mounted thereon and slidably moved therealong. A set screw 100 is provided to permit fixing of the clapper member to the reed at any desired location along its length. It should be understood that the clapper may be of other geometric design.

A collet member 106, cylindrical in shape and having a circumferential groove about its outer perimeter, is secured to the reed by welding, soldering or any other convenient method. The collet is affixed to the reed in the present embodiment at a point which is sufficiently below the level of the frame platform 20 to prevent the coils of the spiral spring 9 from binding on the platform 20. The outer end of the spring is battened to the under side of the platform 20 by means of suitable fastening means, such as a screw 110, which cooperates with a tapped aperture 112 in the platform 20. The frictional attachment between the inner end of the spring and the circumferential groove of collet member 106 is sufficient to maintain the spring in attached relation with the reed member.

It has been found that the outer end of the spring should be battened at a point which is approximately 45° from the transverse line A—A which extends along the line of travel of the reed and through the center of the spring as shown in Figure 2. If the spring is battened at an angle other than 45° from the transverse line A—A, a strain due to the battening angle is placed on the spring.

With the spring secured as shown in Figure 2, the dominant tendency of motion of the spring (if the spring were free to wobble) would be in the direction A—A, with a secondary tendency in the direction B—B. Accordingly, if the spring were in a position rotated at 90° from its present mounting with the battening point at 114 instead of 112 as shown, a less desirable but a workable position of the spring would be obtained. With reference to the top view of Figure 2, it is observed that the spirals of the conical-helical or spiral spring run counterclockwise from the center.

A pair of gongs 116 and 118 are secured eccentrically to the platform 20 with their open ends facing away from frame 20, and are attached to the platform by suitable means, such as the screws indicated generally at 120 and 122 respectively. As shown hereinafter screws 120 and 122 may cooperate with apertures 124, 126 and 128 on platform 20 of the frame member.

One novel volume control means which is provided to permit the selective adjustment of the volume of the ringers by the subscriber is shown in Figures 1–7 inclusive. Assuming the ringer is to be positioned in a horizontal plane in a desk telephone set, the illustration of Figure 7 sets forth the manner in which volume adjustment may be effected, it being understood that the arrangement is not limited to this particular manner of mounting.

As shown in Figure 7, a right angle tubular member 129 is mounted in the base of the set for rotation in a clockwise or counter-clockwise direction. A U-shaped member 131 is mounted on the inward end of the adjusting arm, with the arms of the U-shaped member 131 positioned at opposite sides of the armature reed member 8. The U-shaped member 131 may be attached to the movable arm 129 by a welding, swaging or other suitable attaching method. It is apparent that as the movable arm is moved clockwise or counter-clockwise, the arms of the member will approach the reed 8. It is apparent that suitable holding means such as notches or serrations may be provided to maintain the adjusting arm 129 in any of its positions as moved thereto. The arms of member 131 are resilient in nature so that with varying positions of the handle they absorb varying amounts of energy from the vibrating reed, and thereby regulate the volume of the ring by reducing the physical impact of the clapper against the gong. It is apparent that notches or other conventional limit means may be used to provide predetermined settings for the volume adjuster.

The novel volume control means disclosed in connection with this ringer embodiment is, of course, adapted for use with the other embodiments of the disclosure and other known commercial ringers. Other new and novel volume control means which may be used with the ringer embodiment shown in Figures 1–7 are shown in connection with the further ringer embodiments described hereinafter.

In operation, with the application of a ringing signal to the coil 4 of the ringer, the armature 7 is operated alternately between a position adjacent the gap forming surface 29 and the gap forming surface 48. The flexible reed 8 and the attached clapper member 11 are vibrated with the movement of the armature so that the clapper member 11 strikes the alternate gongs 116 and 118 to produce a sound signal.

Each time the reed is moved from its normal position the eccentric coils of the conical-helical or spiral spring 9 are compressed, whereby a biasing force is created which tends to restore the reed 8 to its normal rest condition.

*Ringer operation*

The magnetic circuits for effecting ringer operation of the embodiment shown in Figures 1–7 are set forth in Figures 8–12. As shown by the arrows in Figure 8, with the coil in the deenergized condition flux flows from the north pole of the permanent magnet 2 over the abutting portion 44 of pole-piece 5 to the armature facing surface 48 thereof, over the air gap to armature 7 and the armature pivot, and to the pole-piece extension 74 and the south pole of the magnet 2. Additionally the flux from the north pole of the magnet flows over the abutting portion 44 of the pole-piece member 5, over the base portion 42 thereof, the laminated core 3, the support arm 26 on the upper pole-piece 6, the connecting arm 28, armature facing surface 29, the intervening air gap, armature 7 and the armature pivot, and pole-piece extension 74 to the south pole of the permanent magnet 2.

Figure 9:
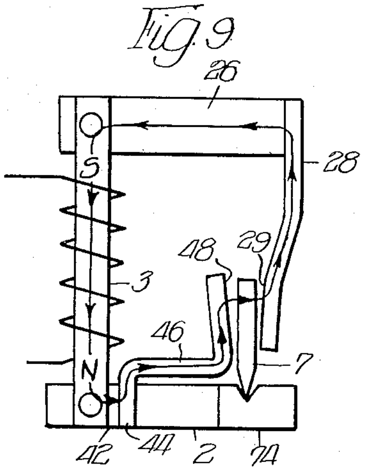

With reference now to Figure 9, assuming energization of the coil by ringing current, and specifically by the half cycle period wherein the lower end of the core is magnetized as a north pole, flux from the north pole traverses the base portion 42 of the lower pole-piece 5 and arms 44 and 46 thereof to armature facing surface 48, the intervening gap to the armature 7, and across the intervening gap to the armature facing surface 29 of the right pole-piece 6, and arms 28 and 26 thereof to the south end of the core 3.

Figure 8:
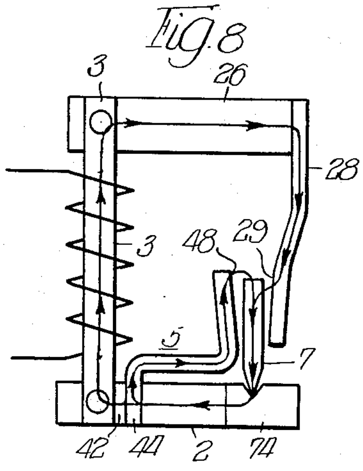
Figures 8–12 are diagrammatic illustrations of the magnetic circuits involved in the ringer of Figure 1 and the various flux paths set up therein for the telephone ringers of Figures 1–7, 13, 16 and 17.
Figure 10:
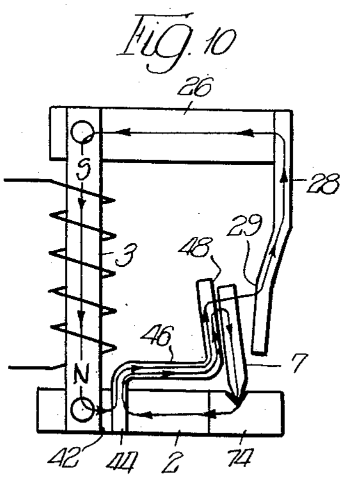

With reference to Figure 10, the arrows thereat illustrate in a single figure the effective ringing current path and the polarizing path, and the relative direction of the flux flow during the period wherein the lower end of the core 3 is magnetized as a north pole. With reference to Figures 8, 9 and 10 it will be apparent that the permanent magnet flux and the ringing current flux are additive in the air gap between the lower pole-piece 5 and the armature 7, and are in opposition in the air gap between the armature 7 and the upper pole-piece 6. Accordingly the armature is rotated counterclockwise to move the clapper 11 against gong 116, whereby the eccentric coils of the spiral spring 9 are compressed.

Figure 11:
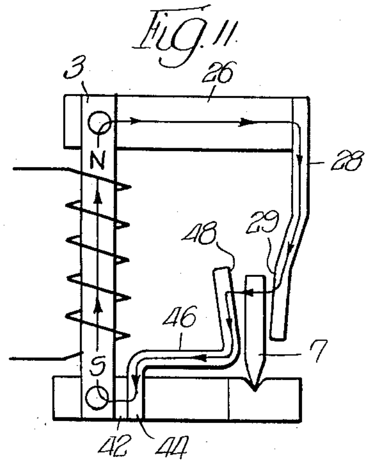

With reference now to Figure 11, the arrows shown thereat teach the direction of flow of the ringing current flux during the alternate half cycle in which the upper end of the core 3 is north in polarity and the lower end of the core 3 is south in polarity. In such event the flux from the north pole traverses the upper pole-piece segments 26, 28 and surface 29, the intervening air gap to armature 7, the second intervening air gap to the lower pole-piece surface 48, and pole-piece sections 46, 44 and 42 to the south pole end of the core 3.

Figure 12:
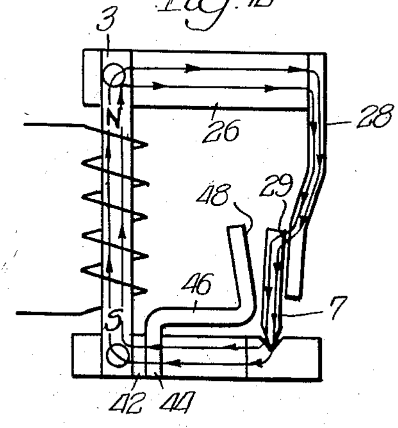

The paths of the ringing current flux and the permanent magnet flux during the alternate half cycle wherein the lower end of the coil is south are shown in Figure 12, and it is apparent from Figures 8, 11 and 12 that during the alternate half cycle the permanent magnet flux and the ringing current flux are additive in the air gap between armature 7 and upper pole-piece 6, and in opposition for the air gap between armature 7 and the lower pole-piece 5.

As the reversal in cycles is effected in this manner, and the armature is moved from its mid or center position responsive to the application of the fluxes, the spring which is under compression tends to return the armature to its mid or center position to thereby provide in conjunction with the magnetic forces the vibratory action of the armature.

It should be observed that the relatively low reluctance alternating current flux path of the disclosed arrangement including the low reluctance pivot mounting and the high impedance coil provide a relatively high voice current impedance device.

With reference to the armature, reed, conical-helical or spiral spring and clapper combination, the following factors are adjustable to provide the desired frequency response of the ringer device. Assuming the reed as a rigid member, the weight of the armature, reed and clapper as concentrated at the centroid and varying one component at a time, the following variations in frequency may be effected:

(1) The heavier the weight, the lower the frequency.
(2) The farther the centroid from the pivot, the lower the frequency.
(3) The stiffer the spring, the higher the frequency.
(4) The further the spring from the pivot, the higher the frequency.

Factors effecting the stiffness of the spring are:

(1) The material of which the spring is made;
(2) The number of turns in the spring;
(3) The cross sectional area of the spring material; and
(4) The cross sectional geometrical configuration of the spring material.

In one embodiment, three loops of music wire of .033 inch diameter forming a coil spring of ⅝ inch radius from center of coil to center of battening point was used.

In that the armature mass is so close to the pivoting point, the mass thereof has a minor effect on frequency. It can be seen from the foregoing that inasmuch as positioning of the spring at a point further from the pivot can be counterbalanced by the positioning of the clapper at the point further from the pivot, the same frequency can be provided by positioning the spring and the clapper at various corresponding and related distances along the reed. It is noted, however, that as the relative distances of the two members is increased from the pivot, the adjustment becomes more vernier.

A convenient manner of adjustment in actual practice comprises establishment of a common positioning point for the spring; varying the spring stiffness to achieve general frequency adjustment; varying the clapper weight to achieve finer frequency adjustment, and varying the clapper position to effect the final frequency adjustment.

Assuming that the provision of a sharply tuned ringer at a given frequency is to be the initial consideration, and remembering that the position of the spring and the position of the weight (except for vernier sliding adjustments) are fixed by the dimensions of the ringer structure, the heaviest weight and the stiffest cooperating spring are selected which will give a mechanical system having the desired fundamental frequency. A coil is then fabricated to provide sufficient power to oscillate the armature at the given frequency through the required distance of excursion even at half nominal voltage. The gongs are then moved eccentrically toward the clapper and secured at the position slightly inside the extremes of this excursion for good sound output.

If the frequency response is to be broadened slightly, the spring stiffness may be reduced a small amount to provide a frequency response band a little below the given frequency, and the weight may be lightened a small amount or moved a short distance toward the pivot to give a frequency response band which is slightly above the given frequency. These general considerations are applicable to assembly of any of the illustrated ringer embodiments.

As hereinbefore described, a feature of the novel ringer structures is the manner in which the ringer units of the disclosure are sufficiently flexible to permit utilization thereof alternatively as harmonic, straight line and superimposed ringers.

Considering first the arrangement as set forth in Figures 1–7 inclusive, it is observed that the fastening members 120 and 122 for gong units 116 and 118 respectively are inserted in apertures 124 and 128 of the frame platform 20 for harmonic type ringers, the holes in the gongs being eccentrically located relative to the true geometric center of the gongs. Also, the spring 9 substantially locates the assembly in an armature-reed-clapper line parallel to the general plane of the ringer frame and midway between the surfaces 29 and 48, whereby the clapper member 11 is normally positioned midway between the edges of the gongs 116 and 118. With the gongs thus mounted and the clapper positioned in this manner, the unit will respond as a harmonic type ringer. The unit may be adjusted to provide any particular frequency of response by use of the appropriate spring stiffness and the weight and position of the clapper.

The following table is exemplary of the wide frequency response which is obtainable by varying the weight and the stiffness of the spring to be utilized. It is noted that an equivalent range of frequencies could be effected by choosing a single spring stiffness and effecting a corresponding variation of the clapper weight. However, variation of the stiffness of the springs in addition provides a more sensitive unit with a given coil power. For various frequencies the following values are specified as illustrative in a ringer unit of the type shown in Figures 1–7 inclusive, wherein a .2 mfd. condenser is connected in series with the coil and a conical-helical or spiral spring of three turns is used.

| Frequency | Coil Turns | Coil Wire Size | Weight—Grams | Spring Wire Size |
|---|---|---|---|---|
| 66⅔ | 18,600 | #36 | 2 | .041″ Spring. |
| 60 | 20,000 | #37 | 4.5 | .041″ Spring. |
| 54 | 21,400 | #37 | 7.6 | .041″ Spring. |
| 50 | 23,500 | #37 | 8.2 | .041″ Spring. |
| 42 | 26,500 | #38 | 4.6 | .033″ Spring. |
| 40 | 27,500 | #38 | 4.6 | .033″ Spring. |
| 33⅓ | 30,000 | #39 | 10 | .033″ Spring. |
| 30 | 32,000 | #39 | 10.5 | .033″ Spring. |
| 25 | 39,000 | #39 | 7.2 | .026″ Spring. |
| 20 | 45,000 | #40 | 10 | .026″ Spring. |
| 16⅔ | 50,000 | #41 | 15 | .026″ Spring. |

In the adaptation of the same ringer for use as a straight line ringer, a frequency near the center of the desired response band is selected. For example, if the frequency response band is to be from 16⅔ to 30 cycles, the point of departure would be a spring-weight combination having a central fundamental frequency of near 23 cycles per second. The spring stiffness would then be reduced sufficiently, and the weight reduced sufficiently to give a frequency response from 16⅔ cycles to 30 cycles. The farther the ringing frequency is from the central frequency, the more the mechanical system is out of phase with the electrical system, and the amplitude of excursion of the clapper is correspondingly decreased. As a result, the gongs should be moved close enough to the clapper to obtain the maximum ringing impact at the upper and lower limit frequencies and then backed away far enough to avoid dial tapping.

With the selection of the substantially central frequency of the ringing band which does not coincide with 20 cycle or 30 cycle harmonics of the 10 cycle dial tapping, that is, 23 cycles in the case of straight line ringers, two tendencies guard against dial tapping; that is, the central frequency being off the dial tapping 20 or 30 cycle harmonic frequencies, and also the differential between the amplitude response to the weaker harmonic as compared to the amplitude response to the stronger fundamental ringing currents. (In the case of harmonic 20 cycle or 30 cycle ringers, this differential in amplitude response must be adequate in itself in view of the coincidence with dial tapping harmonics.)

To increase the sound output of straight line ringers, the spring may be further weakened and the weight further lightened whereby the gongs need not be moved in as far as hitherto explained, allowing a greater excursion of the reed. Additionally, the operating coil may be modified to deliver greater power, involving use of an associated condenser electrically phased at a point between the central frequency and the upper limit.

The above mentioned changes for increased output make the ringer more vulnerable to dial tapping since the armature in the "at rest" condition is located substantially midway between surfaces 48 and 29. A straight line ringer as thus provided is changed to be nonresponsive to dial tapping in the following manner. With reference to Figure 6, a second aperture 126 is provided on platform 20 for mounting the left hand gong 116 closer to the right hand gong 118, and accordingly the left hand gong is so mounted. Next the battening screw 110 is loosened, the center of the spring 9 pushed to the right to a position at which the spring has been rotated 3° or 4° clockwise looking down at Figure 2. The right hand gong 118 is then rotated until it touches the clapper and the battening screw is retightened to forcibly bias the spring. Leads are then connected so as to polarize coil 4 to coincide with the direction of bias, whereby dial tapping tends to push the clapper tighter against the right hand gong.

Instead of rotating spring 9 to forcibly bias the ringer (which normally gives a resisting force), the spring may be so formed that upon assembly this biasing position will be inherently obtained, whereby ringing current does not have to overcome a forced spring bias at the start of movement of the armature. As a result an increased sound output results. Such arrangement is illustrated in Figure 23, it being understood that the spring mounting previously mentioned is again obtained in this embodiment. That is, the distorted spring is battened at a point whereby when the armature passes through its center position the line through the reed center and the point of battening is at an angle of 45° to the line of travel of the reed.

A workable combination for straight line ringers responding to ringing current from 16⅔ cycles to 30 cycles is obtained by using a 30 cycle coil comprising 32,000 turns of #39 copper wire in series electrically with a .5 mf. condenser, a spring of four or five turns of .023 in. diameter music wire, and a 4.5 grams clapper.

Figure 16:
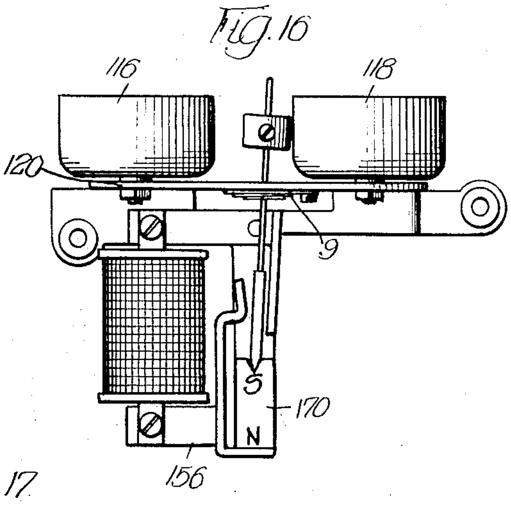
Figure 16 is a front view of a telephone ringer embodying the features of the invention including a straight magnet, the longitudinal and magnetic axes of which are parallel to the core and substantially parallel to the armature, and illustrating the manner in which any of the ringers may be adapted for straight line or for superimposed ringing.

For an example of a biased ringer see Figure 16.

Superimposed ringer units are required to respond to pulses of current of a relatively large amplitude of one polarity while not responding to pulses of small amplitude of the other polarity. The biassed straight line ringer previously described is adapted for superimposed ringing use by altering the coil to meet the power requirements of the polarized system.

The coil winding is connected in series with a uni-directional device (as is customary) instead of in series with a condenser, the device being connected in such direction that a pulse of a large amplitude tends to rotate the armature counterclockwise, while a pulse of a small amplitude tends to push the clapper more tightly against the gong (the smaller amplitude current being the current leakage which generally will pass through a uni-directional device during the reverse alternation).

A workable coil for the superimposed ringer would comprise 13,500 turns of #34 copper wire.

One method of assembly of the ringer of the embodiment of Figures 1–7, which method also has utility in providing the additional embodiments taught hereinafter comprises:

A. Rivet the poles to the frame.
B. Position magnet (and soft iron pole-piece in embodiments which include same) relative to the poles.
C. Mount core and coil sub-assembly.
D. Place keeper in position and secure keeper magnet, soft iron piece, core and coil assembly by means of screws.
E. Insert armature, reed, collet, spring and sub-assembly.
F. Batten spring.
G. Mount gongs.
H. Mount clapper.
I. In non-biassed ringers, center armature between poles by revolving spring slightly; this assembly rotation of the spring (if necessary) will invariably be within the 3° tolerance and usually much less than 3°. In biassed ringers the aforedescribed procedure will be followed.
J. Energize ringer with proper frequency. Rotate gongs until best tone is obtained.

It is apparent from the foregoing description that assembly and adjustment of the ringers can be accomplished with a minimum amount of skill.

U *magnet*

Figure 13:
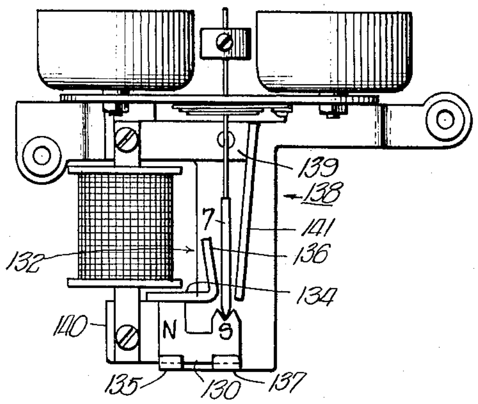
Figure 13 is a front view of a second embodiment of a ringer including a U-type polarizing magnet.

With reference to Figure 13 there is shown thereat a ringer structure of somewhat different physical characteristics. As there shown, magnet 130 comprises a substantially U-shaped member, one arm of the U member being the south pole, and the other arm being the north pole. A V-shaped groove having a small radius at the bottom to provide a pivoting arrangement for the lower end of the armature is located on the upper surface of the south pole arm. The other arm of the U-shaped magnet 130 extends upwardly for contact with the base 134 of the lower pole-piece member 132 of the ringer structure.

The lower and upper pole-pieces are modified to facilitate use of the magnet member in the structure; the lower pole-piece 132, for example, comprising an armature facing segment 136 in the manner of the previous embodiment; an integral magnet contacting surface 134 which abuts the north pole of magnet 130; and a base portion 140, which is fastened to the frame in the manner of the previous embodiment.

The other pole-piece may be of a configuration similar to that of the upper pole-piece of Figure 1, or may comprise a base portion 139 and a straight arm portion 141 which depend angularly downward from the base portion 139 as shown in Figure 13 to form an armature facing segment as in the previous embodiment.

A clip member (not shown) is clipped on the frame and passes across members 136 and 141 for the purpose of retaining the armature.

The ringer may utilize the frame of Figure 6 as modified by cutting a strip from either side of the tab section 22, and bending same forward to form a shelf like receiving section comprised of arms 135 and 137 (see Figure 13). The magnet 130 is placed in the shelf like section, and the ends of the arms 135 and 137 are bent upward to form a retaining edge to prevent outward movement of the magnet from the frame. It is apparent that the magnet is thus fixedly positioned between the horizontal segment 134 of the lower pole-piece member 132 and the arms 132 and 134 of the shelf section. The ringer as shown in Figure 13 is shown as an unbiassed ringer but may be biassed in the manner previously described. The flux paths for the ringer structure are believed to be obvious from the detailed description set forth in connection with the disclosure of Figures 8–12 inclusive.

E *magnet*

Figure 14:
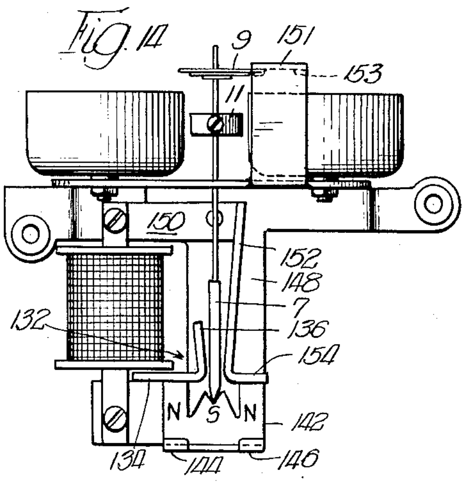
Figure 14 is a front view of a telephone ringer embodying the features of the invention including an E-type magnet and illustrating the manner in which the positioning spring may be mounted above the clapper member.

With reference to Figure 14, there is shown thereat an arrangement wherein a magnet 142 having the configuration of the letter E laid on its side is utilized to provide the polarizing field. The left and right arms of the E-shaped magnet 142 are north poles, whereas the central section of the magnet is a south pole. A V-shaped groove in the outer surface of the middle arm of the magnet has a small radius at the bottom thereof to provide a suitable pivoting arrangement for the armature member. A pair of tab members 144 and 146 bent forwardly of the frame in the manner of tabs 135 and 137 in Figure 13 provide a shelf like arrangement for supporting the magnet member 142.

The lower pole-piece member may comprise a pole-piece member 132 of the embodiment of Figure 13. The upper pole-piece member 148 comprises a base segment 150, an armature facing segment 152 which depends angularly downward from the base 150; and a pole contacting surface 154 which extends laterally of segment 152 and into contact with the one north pole of the magnet 142, as shown in Figure 14. The other north pole of the magnet 142 is in contact with segment 134 of the lower pole-piece 132, and the magnet is thus securely positioned between the arms 144 and 146 and the pole-piece segments 134 and 154. A clip member (not shown) is clipped on the frame and passes across members 136 and 148 for the purpose of retaining the armature. It is apparent that with both pole-pieces in direct contact with the magnet member a closed magnetic circuit is effectively provided which results in a higher impedance to voice currents. A similar condition is provided in the embodiment of Figure 15 and a detailed description of the magnetic path of these two embodiments is more fully set forth thereat.

It is noted that the ringing structure of Figure 14 also illustrates an arrangement wherein the clapper 11 may be mounted between the biasing spring 9 and the armature 7. As there shown, a supporting arm member 151 extends upwardly from the gong supporting platform 20 and a rearwardly depending tab section 153 locates an aperture at the required 45° angle for cooperation with suitable fastening means in battening the outward end of the biasing spring 9.

*Pyramid magnet*

Figure 15:
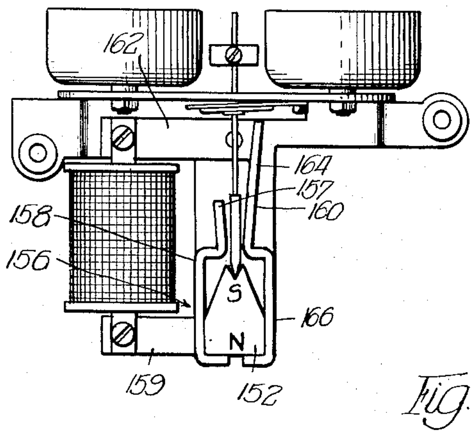
Figure 15 is a front view of a telephone ringer embodying the features of the invention including a pyramid type magnet.

A further ringer embodiment shown in Figure 15 utilizes a pyramid shaped magnet 152 as the polarizing source wherein the base portion is the magnet north pole and the upper peaked portion is the magnet south pole. A V-shaped groove on the upper surface of the south pole provides a pivoting arrangement for the armature member as in the previous embodiments. The magnet dimensions must be such that the slanting sides of the magnet should extend below the midpoint of the magnet.

Lower pole-piece 156 and upper pole-piece 160 are formed to cooperate with the shape of the magnet 152. The lower pole-piece comprises an armature facing section 157, an integral U-shaped segment 158, and a base section 159. A portion of the base of the U-shaped segment is in contact with the north pole of the magnet as shown in Figure 15, a point of departure of the member 158 and magnet 152 being reached below the midpoint of the magnet height. The base portion 159 extends laterally of the U-shaped segment 158 for fastening of the lower pole-piece to the frame in the manner of the previous embodiments.

The upper pole-piece 160 comprises a base segment 162 adapted for fastening of the upper pole-piece to the frame, a connecting segment 164 which depends angularly downwardly therefrom to provide an armature facing section, and a pole contacting segment which comprises a U-shaped segment 166 having its lower portion in contact with the base of the magnet 152. The lower arms of the U-shaped segments 158 and 166 form positioning means for the magnet 152. A clip member (not shown), having arms which pass over the pole-pieces and armature and are clipped to the frame in such a manner as to slide into position along the outer face, prevents outward movement of armature and magnet.

It is noted that the air gap extending between the edges of the V of the south pole of the magnet and the pole-pieces must be wider than the width of the air gap between the armature facing surfaces of the pole-pieces and the armature. This same applies to the other embodiments as well. The lower pivotal region of the armature has a rearwardly extending tab portion which is adapted to engage a cooperating aperture in the frame to thereby position the armature against movement and to cooperate with the lower flanges of the pole-piece members and the clip in retaining the magnet in a fixed operative position. It is of course apparent that should space permit, an air gap may be provided between the pole-piece members and the sides of the magnet, whereby only the bottom face of the magnet will be in contact with the pole-pieces.

The nature of the paths for the ringer structure of Figure 15, as well as the structure of Figure 14, will be apparent with reference to Figures 18–22 in connection with the following description.

Figure 18:
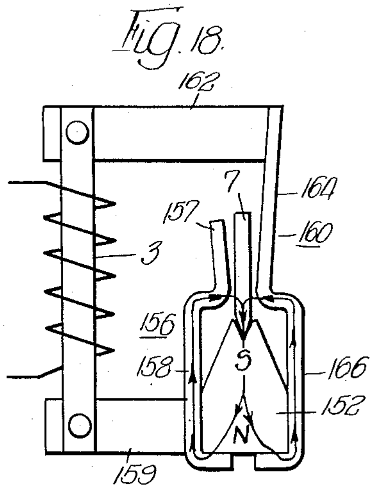
Figures 18–22 are diagrammatic illustrations of the magnetic circuits and flux paths involved in the ringer structures of Figures 14 and 15 inclusive.

With reference to Figure 18, the polarizing flux paths provided by the magnet member as indicated by the arrows therein extend from the north pole of the permanent magnet over the U-shaped segment 158 and the armature facing segment 157 of the lower pole piece 156, the left hand air gap to armature 7, and the south pole of the magnet via the armature pivot and the magnet groove. A portion of the flux emanating from the north pole also passes through the magnet contacting portions of the upper pole segment 166 and the armature-facing segment 164, over the air gap to the armature 7, and to the south pole of the magnet 152 via the armature pivot and the magnet groove.

Figure 19:
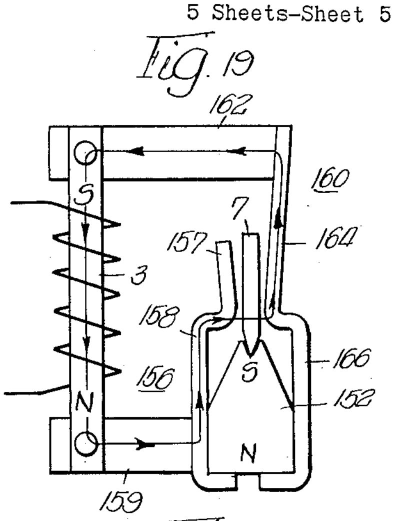

As shown in Figure 19, as the half cycle of the ringing current in which the lower end of the core 3 becomes north, is applied to the coil ringing current flux from the north pole traverses the base portion 159, the U-shaped portion 158, and the armature facing portion 157 of pole-piece 156, over the first air gap to the armature 7, and over the second air gap to the armature facing segment 164 of the upper pole-piece 160, and the base portion 162 to the south pole of the core member 3.

Figure 20:
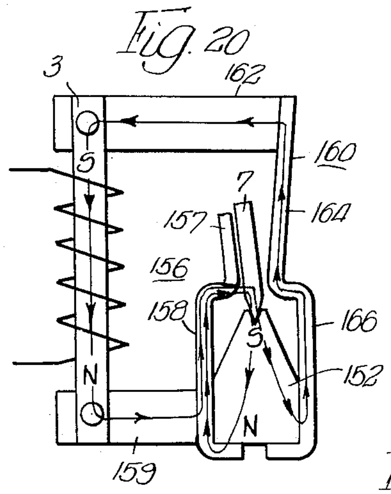

With reference to Figure 20, the arrows thereon indicate the flow of both the polarizing and the ringing current flux with the application of the half cycle of the ringing current in which the lower end of the core is north. As shown by reference to Figures 18–20, the permanent magnet flux and the ringing current flux are additive in the left air gap and are in opposition in the right hand air gap, and the armature is rotated counterclockwise in an obvious manner to cause the clapper 11 to strike gong 116.

As the armature approaches the left pole-piece the left permanent magnet flux path becomes stronger and the right permanent magnet flux path weaker. Also the left gap presents a lower reluctance path to alternating current flux while the right gap presents a higher reluctance path. Accordingly, a portion of the flux progressively approaches the situation shown in Figure 20 in which some of the ringing current flux traverses the permanent magnet.

As shown in Figure 20, the ringing current flux passes from the north pole of the core over the base 159, the U-shaped segment 158, and armature facing segment 157 of lower pole-piece 156 to armature 7, and branches, part traversing the right hand air gap, members 164 and 162 to the south pole of the core and part traversing the magnet 152 to the U-shaped section 166, connecting section 164 and base 162 of upper pole-piece 160 and the south pole of coil 3.

The coils of spring 9 are placed under compression as the armature is thus moved and as the half cycle is terminated, the spring member urges the armature toward its center position.

Figure 21:
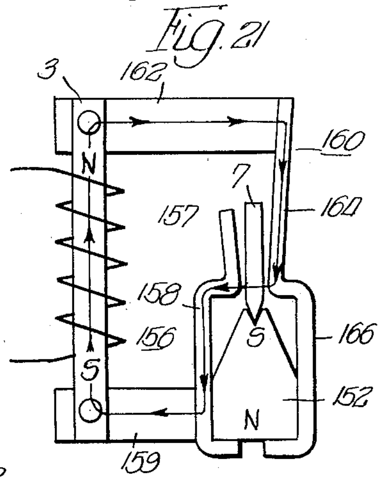

With reference now to Figure 21, the arrows thereat indicate the manner of flow of the ringing current flux during the application of the alternate half cycle wherein the upper end of the core becomes north in polarity. As there shown, flux from the north pole traverses the base 162, and the armature facing section 164 of upper pole-piece 160 across the right hand air gap to the armature 7, and across the left hand air gap to the armature facing section 157, and the U-shaped section 158 and base 159 of the lower pole-piece 156 to the south pole end of the core.

Figure 22:
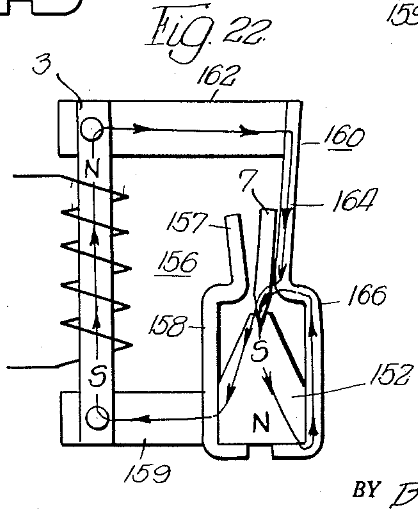

With reference to Figure 22, there is shown thereat the manner in which the flux provided by the ringing coil and the flux of the permanent magnet cooperate to effect movement of the armature in a clockwise direction. That is, the permanent magnet flux and the ringing current flux are additive in the right hand air gap and are in opposition in the left hand air gap.

Furthermore, as the armature approaches the right pole-piece the right permanent magnet flux path becomes stronger and the left permanent magnet flux path weaker. Also the right gap presents a lower reluctance path to alternating current flux while the left gap presents a higher reluctance path. Accordingly, a portion of the flux progressively approaches the situation shown in Figure 22 in which some of the ringing current flux traverses the permanent magnet. The armature is thus rotated clockwise to place the coils of the spiral spring under compression. The path for the ringing current flux as shown in Figure 22 now extends from the north pole of the core through the support arm 162 and armature facing surface 164 of the upper pole-piece 160 to armature 7, and branches, part traversing the left air gap, members 157 and 158 to member 159 and another part traversing the magnet 152, the U-shaped section 158 and base 159 of the lower pole piece 156 to the south pole of the core 3. It is apparent that as the half cycle is terminated, the tension spring will tend to return the armature to its neutral position.

*Straight magnet*

With reference to Figure 16, there is shown thereat a rectangular shaped magnet member 170 mounted so that the magnetic axes of the permanent magnet and coil and the longitudinal axis of the armature are substantially parallel. The magnet 170 may be maintained in the position shown by clip means (not shown) of any one of a number of obvious configurations. The lower pole-piece member may be of the general configuration of the pole-piece member 156 of Figure 15, and the upper pole-piece may be of the general configuration of the upper pole-piece 138 of Figure 13.

The operation of the ringer will be apparent with reference to the previous description of the operation of the basic ringer embodiment and with reference to the magnetic paths illustrated in Figures 8–12 inclusive.

As previously mentioned, the left hand gong 116 in Figure 16 is secured to aperture 126 (see Figure 2) by screw means 120, and the armature is biased by spring 9 in the direction of gong 118, whereby the ringer structure of Figure 16 is adapted for use as a superimposed or straight line ringer. It is apparent that the embodiment may be adapted for use as a harmonic ringer by mounting the left hand gong 116 in alignment with aperture 124 and having the spring member 9 positioning the armature to a substantially center position.

*Volume control units*

Figure 17:
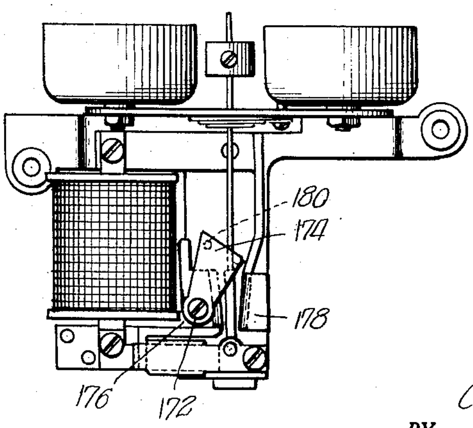
Figure 17 is a front view of a telephone ringer embodying a novel magnetic volume control arrangement of the invention.

A further novel means for effecting adjustment of the volume of the ringer output is set forth in Figure 17. A control shaft (not shown) carrying a thumb-knob which is accessible to the subscriber at the base of the substation set, extends inwardly of the substation set to the front of the ringer structure, and at its inner end mounts in a firmly positioned manner an ear like tab 174 of soft iron material. As shown in Figure 17, the control shaft is supported by the base and a flange member 176 which is an integral part of the lower pole-piece, it being obvious that other convenient methods of support for the control shaft may be provided. A second flange 178 is located on the upper pole-piece for cooperation with the rotatable shunt tab 174. With rotation of the control shaft, the ear member will be moved across the flange portions 176 and 178. With the ear tab moved across the upper and the lower pole-pieces, the A. C. path is shunted, and the operation of the armature is reduced to decrease the sound output. More specifically, when the above described volume control adjustment is applied to harmonic ringers, as the A. C. shunting effect is increased, there is a slight reduction in the excursion of the vibratory member with a concurrent material decrease in the force of impact with which the clapper strikes the gong. The A. C. shunting effect in a straight line ringer reduces materially both the excursion of the armature assembly and the force of impact of the clapper against the gong. Adjustment of the tab 174 to different positions between the upper and lower pole-pieces effects a corresponding adjustment of the volume of the sound output of the ringer.

As in the previous volume control adjustment means, suitable notches or serrations or other position indicating means may be utilized at the base of the substation set, or in the interior to limit the amount of rotation of the members. As shown in Figure 17, a tab 180 located on the back of the tab 174 will engage the flange portions 176 and 178 as the limit of rotation is reached in either direction.

It is apparent that the disclosed structures have high voice current impedance by reason of the small air gaps, and the low reluctance pivot region together with the relatively high resistance and high inductance of the coil. With the closed magnetic circuit of certain of the embodiments shown, the impedance to voice currents is still higher. As a result, the unit is particularly well adapted for use on multi-party line installations.

It should be understood that other means of supporting the spring at its outside end may be employed, as for example, a flanged cup-shaped cylinder in which the spring rides without being battened. It is also noted that in any of the embodiments, the permanent magnet poles can be reversed.

While there have been described what are regarded to be preferred embodiments of the invention, it will be apparent that various changes, rearrangements and modifications may be made therein without departing from the scope of the invention, as defined by the appended claims.

What is claimed is:

1. A frequency responsive device comprising a controlled member mounted for lateral movement in a substantially fixed plane, a spiral-coil type spring member disposed with its coils in encompassing relation with said controlled member having its outer end fixedly positioned and its inner end coupled to said controlled member to control the position thereof, said outer end being fixedly positioned on a line which extends through the approximate center point of the spring at an angle of substantially 45° to said plane of movement of the controlled member, means for pivotally supporting one end of said controlled member, means for applying operating forces to said controlled member to move the second end thereof laterally across the coils of said spring in said plane, and mass means attached to said controlled member to render the controlled member operative only responsive to the application of said operating forces at a predetermined frequency.

2. A telephone ringer device comprising a clapper carrying armature member having a predetermined normal position, and being pivotally mounted at one end for lateral movement in a substantially fixed plane, a spiral-coil spring type member mounted with its coils surrounding said clapper-carrying armature member having its outer end fixedly positioned and its inner end coupled to said clapper carrying armature member, means for applying operating forces to said clapper carrying armature member to urge same to move from its normal position laterally across the coils of said spring in said plane, and sound producing means positioned for operation by the clapper device on said armature member responsive to said lateral movement of said armature member, said spring being operative with the removal of said force to return same in the direction of said normal position.

3. A telephone ringer device comprising a clapper carrying armature member pivotally mounted at one end for lateral movement in a substantially fixed plane, a spiral-coil spring type member mounted with its coils surrounding said clapper carrying armature member and having its outer end fixedly positioned and its inner end coupled to said clapper carrying armature member, said outer spring end being fixedly positioned on a line which extends through the approximate center point of the spring at an angle of substantially 45° to the plane of movement of the controlled member with said clapper carrying armature in a predetermined normal position, means for applying operating forces to said clapper carrying armature member to urge same to move from said predetermined normal position laterally across the coils of said spring, said spring being operative with the removal of said force to return same in the direction of said normal position, and sound producing means positioned for operation by the clapper device on said armature member responsive to said lateral movement of said armature member.

4. A telephone ringer device comprising a clapper carrying armature member, permanent magnet polarizing means, a groove on a member of said polarizing means for pivotally supporting one end of said armature member to permit lateral, arcuate movement of the other end of the armature member in a substantially fixed plane, a spiral-coil spring type member mounted with its spiral coil in encompassing relation with said clapper carrying armature member with the inner end thereof coupled to said clapper carrying armature member to control the position thereof, anchor means for fixedly positioning the outer end of said spring on a line which extends through the approximate center point of the spring at an angle of substantially 45° to the plane of movement of the controlled member, means for applying operating forces to said clapper carrying armature member to urge same to move laterally across the coils of said spring, and sound producing means positioned for operation by the clapper device on said armature member responsive to said lateral movement of said armature.

5. A telephone ringer device comprising a clapper carrying armature member pivotally mounted at one end of said armature for lateral, arcuate movement in a substantially fixed plane, a spiral-coil spring type member surrounding said clapper carrying armature member and having its outer end fixedly positioned and its inner end coupled to said armature member to control the position thereof, magnetic flux producing means for applying electromagnetic forces to said armature member to urge said clapper carrying armature member to move laterally across the coils of said spring in said plane, sound producing means positioned for operation by the clapper device on said armature member responsive to said movement, and magnetic shunt means for directly adjusting the value of the electromagnetic forces applied to said armature member to thereby vary the output volume of the sound producing means.

References Cited in the file of this patent

UNITED STATES PATENTS

| | | |
|---|---|---|
| 37,577 | Hathaway | Feb. 3, 1863 |
| 180,644 | Sabin | Aug. 1, 1876 |
| 185,872 | Solomon | Jan. 2, 1877 |
| 629,461 | Nichols | July 25, 1899 |
| 811,645 | Lehr | Feb. 6, 1906 |
| 902,105 | North | Oct. 27, 1908 |
| 1,338,557 | Crawford | Apr. 27, 1920 |
| 1,373,331 | Hupp | Mar. 29, 1921 |
| 1,644,783 | Lissel | Oct. 11, 1927 |
| 2,046,698 | Power | July 7, 1936 |
| 2,111,540 | Armstrong | Mar. 22, 1938 |
| 2,209,172 | Putman | July 23, 1940 |
| 2,265,066 | Devaux | Dec. 2, 1941 |
| 2,310,754 | Terjesen | Feb. 9, 1943 |
| 2,336,425 | Shenton | Dec. 7, 1943 |
| 2,580,123 | Pfleger | Dec. 25, 1951 |
| 2,627,401 | Harada | Feb. 3, 1953 |
| 2,691,749 | Durkee | Oct. 12, 1954 |
| 2,697,187 | Sonnemann | Dec. 14, 1954 |

FOREIGN PATENTS

| | | |
|---|---|---|
| 16,335 | Britain | of 1892 |
| 237,865 | Switzerland | Sept. 1, 1945 |